United States Patent Office 3,439,260
Patented Apr. 15, 1969

3,439,260
WELL LOGGING BY NUCLEAR MAGNETIC DETECTION OF C¹³
Georges J. Bene, Saint Jeoire-Faucigny, France, assignor to Institut Francais du Petrole, des Carburants et Lubrifiants, Rueil-Malmaison, Hauts-de-Seine, France
Continuation of application Ser. No. 452,312, Apr. 30, 1965. This application Feb. 26, 1968, Ser. No. 708,422
Claims priority, application France, Apr. 30, 1964, 973,177
Int. Cl. G01n 27/78; G01r 33/08
U.S. Cl. 324—.5       7 Claims

ABSTRACT OF THE DISCLOSURE

By using a nuclear magnetic technique whereby a prepolarization field is interrupted to initiate the free precession of proton spins around a constant magnetic field, and receiving the resultant free precession signal, the presence of hydrocarbon is determined by identifying very small symmetrical peaks associated with $C^{13}$ surrounding a central peak which heretofore could not be distinguished as either hydrocarbon or water.

---

This application is a continuation of application Ser. No. 452,312 filed Apr. 30, 1965, and now abandoned.

The present invention relates to a system for the detection of hydrocarbons, said system being particularly applicable to the exploration of petroleum deposits.

Among the methods previously suggested for the detection of hydrocarbons are those wherein the magnetic nuclear resonance phenomenon is used, certain of such methods being based on difference in times of relaxation (time constant of the signal decrease) of the protons, in water and mineral oil, respectively (see French Patent No. 1,096,908, for example). These methods unfortunately are not specific because in practice the relaxation times of protons in water and petroleum, respectively, when they are contained in the rocks, are of the same order of magnitude, especially because of the state of dispersion in which these two products occur.

A principal object of this invention, therefore, is to provide improved methods for the detection of hydrocarbons and, in particular, methods which permit differentiation between water and hydrocarbon.

Another object is to provide novel apparatus for the operation of the method of this invention.

Upon further study of the specification and claims, other objects and advantages of the present invention will become apparent.

The system of detection of hydrocarbons according to this invention is based on proton resonance due to the indirect interaction between the nuclei of hydrogen and carbon 13 contained in the hydrocarbons.

The method of this invention which permits the detection om hydrocarbons in the underground formations, placed in a constant magnetic field, consists of subjecting such formations to a magnetic prepolarizing field, interrupting the field in such a manner as to provoke the free precision of proton spins around the constant magnetic field to determine the resultant resonance signal spectrum, the latter containing a central peak at the resonance frequency of fre protons and to deduce, from the presence precesion of proton spins around the constant magnetic frequency of free protons and to deduce, from the presence of symmetrical satellite peaks about the central peak, the presence of hydrocarbons in the formation.

The constant magnetic field in which the undeground formations are placed, will be, in the simplest form of this invention, the only terrestrial magnetic field to which the formations are normally exposed.

It is well understood however that it will be possible, without going beyond the scope of this invention, to superpose upon the terrestrial magnetic field, a permanent field $\vec{H}_1$ produced in a known manner and having either the same or a different direction from the terrestrial magnetic field. The formations studies are then exposed during the entire time of the measurements, to the constant magnetic field $\vec{H}_0$ represented by the geometric sum of vector $\vec{H}_1$ and of the terrestrial magnetic field vector.

The description of the invention will refer, by way of example and not as a limitation, to the case where the permanent magnetic field, about which the spins of the protons precess freely after cutting out the prepolarization field, is only the terrestrial magnetic field.

It is well known that when a constant magnetic field is superimposed on the terrestrial magnetic field, the mechanism of the invention remains the same and hence the same apparatus can be used for the detection and/or the measurement of peaks of the resonance spectrum in proceeding with the proper adjustment.

The protons $H^1$ and the nuceli $C^{13}$, both of which have a spin of ½, interact. The result is that in a methyl group where all the protons $H^1$ are equivalents, the signal produced by the protons $H^1$ which are bound to the $C^{13}$ atoms, in a nuclear magnetic resonance spectrum, will be double, i.e., there will be two symmetrical peaks with respect to a central peak corresponding to the resonance of the protons bound to the $C^{12}$ atoms (for which no interaction is possible, $C^{12}$ having a zero spin).

The frequency $\nu$ of resonance corresponding to this central signal in a field $H_0$ is given by the formula:

$$\nu = 4257\ H_0 \begin{cases} \nu \text{ in Hz. or cycles/second} \\ H_0 \text{ in oersteds} \end{cases}$$

It is 2,000 Hz. in a terrestrial magnetic field of 0.470 oersted and varies as the latter with the location and the time.

Where mention is made hereinafter of the frequency of the central signal as equal to 2,000 Hz., it should be understood to mean in reality the frequency of the resonance signal of the protons that are not bound to the $C^{13}$ atoms in the terrestrial magnetic field, for the value of the latter, at the place and at the time of the experiment, which frequency is in the neighborhood of 2,000 Hz., but which should be determined exactly by the above relation.

The magnetic resonance spectrum of the protons of a hydrocarbon containing methyl groups in the terrestrial magnetic field is, as a first approximation, a triplet having at a frequency $\nu = 2,000$ Hz., a central peak corresponding to the resonance of protons not bound to the $C^{13}$ atoms and two lateral satellite peaks very nearly symmetrically disposed with reference to the central peak, these satellite peaks representing the resonance of protons $H^1$ bound to the $C^{13}$ atoms. The frequency difference between these two satellite peaks is a constant equal to about 124±2 Hz.

The ratio of the sum of the areas of the two satellite peaks to that of the central peak is equal to 1.108% in the case of a hydrocarbon such as hexane (this ratio is exactly equal to the proportion of the $C^{13}$ atoms in the hydrocarbon, since the two following ratios are equal)

$$\frac{\text{Number of } C^{13} \text{ atoms}}{\text{Number of } C^{12} \text{ atoms}}$$

and $$\frac{\text{Number of protons bound to the } C^{13} \text{ atoms}}{\text{Number of protons bound to the } C^{12} \text{ atoms}}$$

Hence:

$$\frac{h}{H} = \frac{\text{area of a satellite peak}}{\text{area of a central peak}} = 0.55\%$$

(0.55% of the $H^1$ protons of the hydrocarbon resonate at the frequency $\nu + \Delta\nu$ is approximately 2,000+62 Hz.

and 0.55% at the frequency $\nu - \Delta\nu$ is approximately 2,000—62 Hz.)

These results are approximately valid for crude petroleum.

In fact, all the protons of the latter are directly bound to the carbon atoms, the most frequent groupings being:

$CH_3$—R and R''—$CH_2$—R' (where R, R' and R'' are aliphatic groups of any kind).

The result is that for all these protons the value of the resonance signal due to the interaction $C^{13}$—$H^1$ is very nearly the same.

In crude petroleum the protons which are found in benzene rings or in

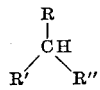

groups are in only small amounts.

The difference between the aspect of the nuclear resonance signals of the protons of crude petroleum and those of an aliphatic hydrocarbon such as hexane is that in the first case there is observed a flattening of the two satellite peaks by interaction between the protons and the non-adjacent $C^{13}$ nuclei and interaction proton-proton. The interaction, here of only little importance, between the protons and the $C^{13}$ nuclei in aromatic rings contributes to another resonance doublet of which the peaks, which are much less intense than the preceding ones, are separated appreciably by 79±1 Hz. from the central peak and are therefore sufficiently spaced from those corresponding to the interactions $C^{13}$—$H^1$ on the aliphatic groups.

According to this invention the method of detection of hydrocarbons such as crude petroleum consists of introducing a sonde into the explored formation, causing the protons of this formation to enter into magnetic resonance, and receiving the resonance signal. If the proton resonance spectrum appears in the form of a triplet, the ratio is calculated as follows:

$$\frac{h}{H} = \frac{\text{area of a satellite peak}}{\text{area of the central peak}}$$

If the ratio is of the order of 0.55%, the conclusion will be that there is present a pure hydrocarbon.

If the ratio is less than 0.55%, the conclusion will be that in the absence of protons on benzene rings, there is present a mixture of hydrocarbons and water in the corresponding proportion (the protons of water, not being bound to $C^{13}$ atoms, resonate at the frequency of the central peak of which they increase the intensity more than the protons of a pure hydrocarbon).

The restriction concerning benzene protons is not serious, assuming that such protons are absent or occur in only small amounts.

If $a$ represents the ratio of hydrocarbons to water in the formation under consideration, then $$a\% = 100 \left( \frac{h}{0.0055H - h} \right)$$

In the case where the formation contains only water, there will not be any triplet but only a single peak at the frequency of 2,000 Hz. ($h=0$).

The invention will now be described in greater detail with reference to the annexed drawings wherein.

Figure 1:
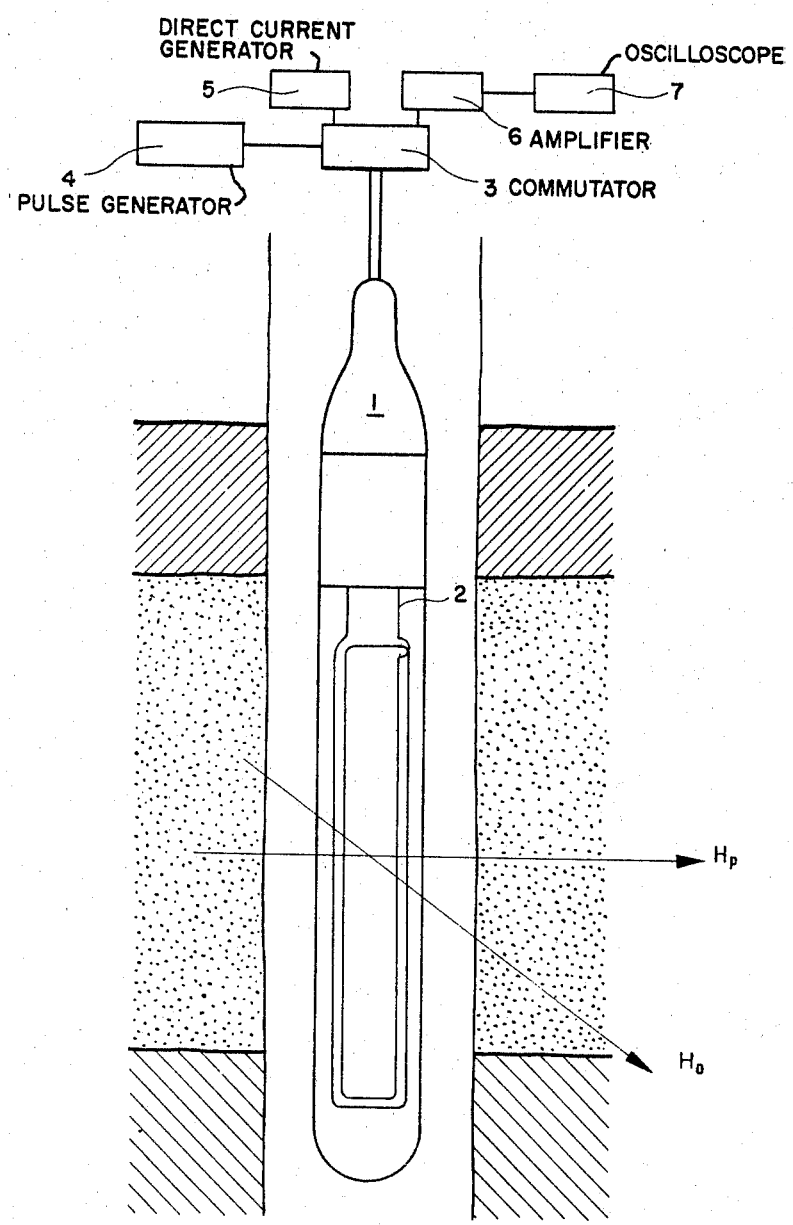
FIGURE 1 represents schematically a longitudinal section of the sonde used in one embodiment of this invention, positioned in a bore hole, and also the emission, detection and registering mechanism associated therewith.

In FIGURE 1, $H_o$ represents the constant magnetic field to which the formations under study are subjected, as for example the earth's magnetic field.

In the example shown in FIGURE 1, the sonde 1 comprises coil means 2 which can be connected selectively through commutator means 3, which can be controlled by the pulse generator means 4, to an apparatus 5 for the emission of a prepolarization field, designated $H_p$, or to a resonance signal receiver comprising an amplifier 6 and registering means 7.

According to this preferred embodiment, the apparatus 5 is comprised of direct current generator means. Other equivalent modes can be adopted, as for example those in which the generator means 5 would produce rectangular waves of a duration corresponding to the prepolarization times and which could be associated with the pulse generating means corresponding respectively to the forward front and rear front. With these generating means there can be associated commutating means adapted to disconnect the receiving apparatus from the time of reception of a pulse corresponding to the forward front of the rectangular wave and to reconnect it from the time of reception of a pulse corresponding to the rear front.

Figure 2:
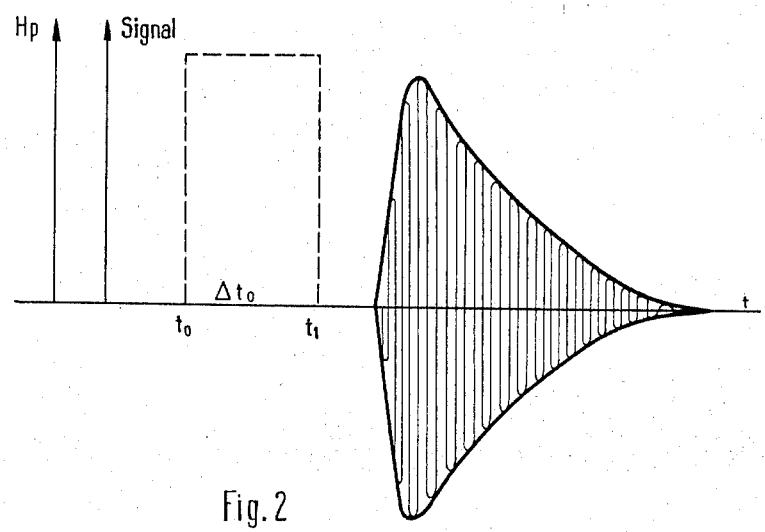
FIGURE 2 represents graphically the magnetic polarization following the nuclear resonance signal from a formation which does not contain hydrocarbons.
Figure 3:
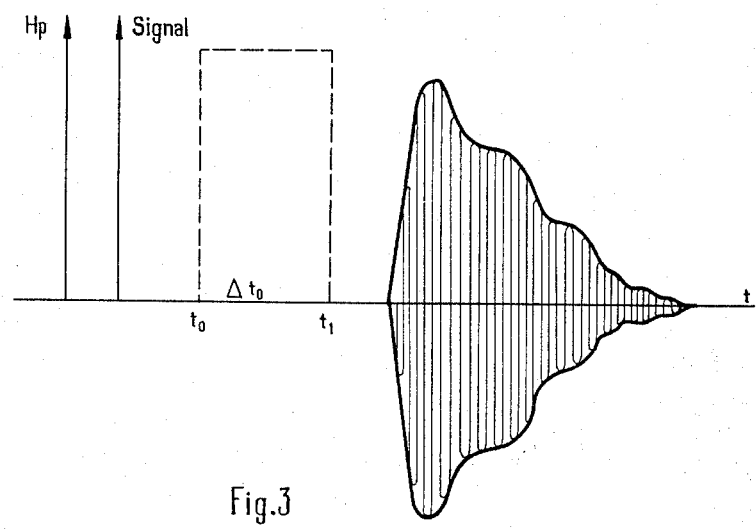
FIGURE 3 represents under the same conditions the nuclear resonance signal when the formation contains hydrocarbons.

The prepolarization $H_p$ is applied between the instants $t_0$ and $t_1$, during an interval of time equal to $\Delta t_0$ (FIGURES 2 and 3).

After cutting out this field, the recorder 7 receives a magnetic resonance signal having the form indicated in FIGURE 2 if the formation which passes through the boring contains only water, and the form indicated in FIGURE 3 if the formation contains hydrocarbons.

The form of signal obtained in the two cases is explained in the following manner: when the coil means is traversed by a current producing the prepolarization field $H_p$, the total magnetic moment $\vec{\mu_p}$ of the protons becomes aligned according to $\vec{H_p}$. When $H_p$ is cut, the vector $\vec{\mu_p}$ precesses around the vector $\vec{H_o}$ representing the terrestrial field until it aligns itself with the latter.

The frequency of precession in the terrestrial field of the protons which are linked to water or bound to the atoms of carbon 12 is 2,000 Hz. These protons are the only ones which exist when the explored formation contains water, the resonance signal then having the simple form represented in FIGURE 2.

If, on the contrary, a hydrocarbon is present, at this resonance frequency of 2,000 Hz. of the protons that are bound to the $C^{12}$ atoms, there are added two satellite frequencies since, because of the existence of $C^{13}$, 0.55% of the protons resonate at the frequency 2,000+62 Hz. and 0.55% resonate at the frequency 2,000—62 Hz. Between these two frequencies, beats will occur, resulting in the curve form shown in FIGURE 3.

Figure 4:
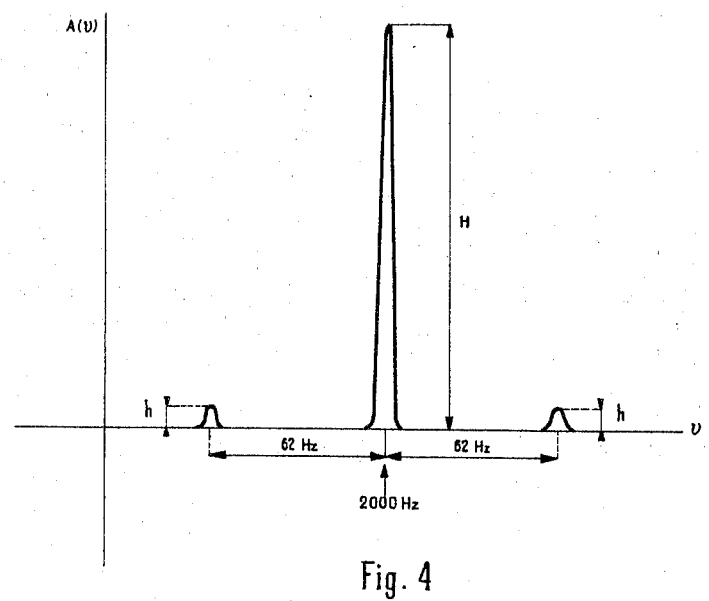
FIGURE 4 represents the amplitude of the nuclear resonance signal, at different frequencies, coming from a formation containing hydrocarbons.

In one form of this invention, a resonance signal like that of FIGURE 3 is subjected to a Fourier analysis in order to determine the spectral frequencies contained in this signal. This spectrum will have the appearance of that represented in FIGURE 4 where $\nu$ is the frequency and $A(\nu)$ is the corresponding signal amplitude. A determination is then made of the ratio $h/H$ giving the proportion of protons that are bound to the $C^{13}$ atoms, and hence the amount of hydrocarbon in the explored formation.

In a simplified form of this invention, a bandpass filter is used in the receiver for detecting the signal. The filter is first adjusted to a frequency equal in Hz. to about 4,257 times the value expressed in oersteds of terrestrial magnetic field, namely about 2,000 Hz. which corresponds to the resonance frequency of the protons which are linked to water or bound to the atoms of $C^{12}$. Two other measurements are then made by adjusting the filter successively to the two frequencies of $2,000+(62\pm1)$ Hz. and $2,000-(62\pm1)$ Hz. corresponding to the resonance of protons bound to $C^{13}$ atoms. Each time the intensities of the signals are measured.

It is also possible, although apparently to lesser advantage, to tune the filter successively to the frequency of about 2,000 Hz., and then to frequencies of $2,000+(79\pm1)$ Hz. and $2,000-(79\pm1)$ Hz., respectively.

The presence of satellite peaks at these two last frequencies is evidence of the presence of aromatic hydrocarbons in the ground. However, as aromatic hydrocarbons are generally found in very low proportions in raw petroleum, the presence of these satellite peaks occurs most frequently only simultaneously with those peaks corrsponding to the presence of aliphatic hydrocarbons, namely resonance frequencies of about $2,000\pm62$ Hz.

To avoid having to repeat a measurement for each frequency, it is possible to receive the resonance signal on a magnetic register or recorder. This recorder can then be used as many times as desired to extract resonance signals of different frequencies. To achieve this end, it is sufficient to connect the magnetic register to a graphical indicator or recorder across a band-pass filter having an adjustable frequency by which one can vary the tuning frequency in the band of the signal frequencies.

Alternatively, there can be employed a detection apparatus comprising two band-pass filters adjusted respectively on the frequency of the central peak of proton resonance and on one of the satellite peaks, or three band-pass filters adjusted respectively on the frequencies of the central peak and on each one of the satellite peaks. By the latter operating technique, it is possible to determine the values of $H$ and $h$ by only one measurement.

Figure 5:
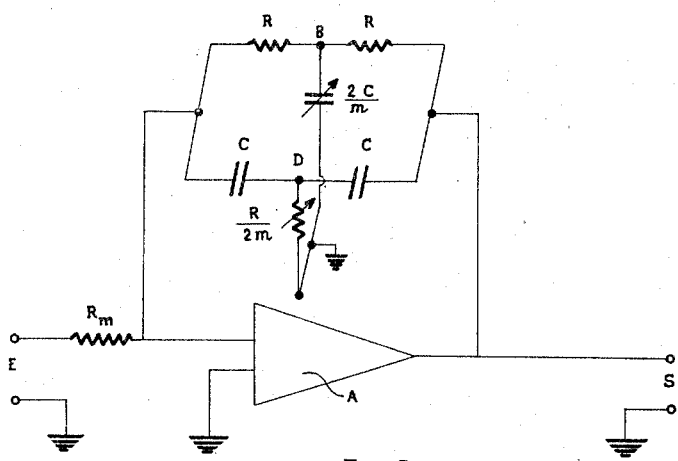
FIGURE 5 represents a variable band-pass filter which can be used for the detection of peaks in the resonance spectrum.

An example of a conventional band-pass filter which can be employed in the process of this invention is illustrated in FIGURE 5. This filter comprises, between the entrance terminals E for the resonance signal appearing in coil 2 after cutoff of the magnetic prepolarization field, and the exit terminals S, connected to recorder 7, successively a matching resistance $Rm$ and two circuits connected in parallel.

The first of these circuits includes a conventional operational amplifier A having a gain G at the entrance from which there is applied the resonance signal entering at E. The outlet of the amplifier is connected to outlet S of the filter, and the output signal from the amplifier is fed back to the inlet thereof through the second of said circuits.

This second circuit contains two arms connected in parallel. One of these arms contains two resistances in series of equal value R. The other arm contains two condensers in series having the same capacity C. The junction points B and D, respectively, of these two resistances R and two condensers C are connected across a variable condenser having a capacity $2C/m$, $m$ being a variable parameter, and a variable resistance of the value $R/2m$, in series with the condenser. The junction point of the latter two elements is grounded.

Such a band-pass filter has a tuning frequency $\omega_0$ of the formula:

$$\omega_0 = \frac{\sqrt{m}}{RC}$$

This tuning frequency can then be modified by making a variation in the parameter $m$ by a simultaneous adjustment of the variable resistance $R/2m$ and variable condenser $2C/m$. Once tuned to a determined frequency $\omega_0$, the filter permits passage between the terminals E and S of only the frequency band $$\omega_0 \pm \frac{2\omega_0}{G+1}$$

The width of the frequency band can be regulated by adjusting gain G of amplifier A, the filter band becoming narrower as the gain is increased.

The magnetic prepolarization field $H_p$ which is used in this invention should be comprised of, for example 10 to 1,000 oersteds. So that this process can be applicable for the detection of hydrocarbons, it is suitable for the signal-to-noise ratio of the apparatus measuring the magnetic resonance of the protons to be higher than 200, for example on the order of 1,000 (the height of the satellite peaks on the frequency spectrum of proton resonance amounts to only about $\frac{1}{200}$ of that of the central peak).

A suitable amplification of the satellite signals is highly advantageous.

The quality factor of the coil means, $Q = L\omega/R$ wherein L represents the self-inductance and R the ohmic resistance of this coil, and $\omega = 2\pi\nu$, should be high for the frequencies $\nu$ of the received resonance signals, so that these signals be as intense as possible.

It is also possible to use the process of this invention with measuring instruments having a signal-to-noise ratio of a little higher than 200 and even a little lower, by the employment of a conventional memory device with play back.

This conventional apparatus effects a sampling of the ordinates of a response curve (such as that shown in FIGURE 3) and gives the average value of the samplings from the same abscissa, for $n$ measurements. If $n$ is sufficiently large, the influence of the noise disappears then from this average value as a result of the random character of the noise (the noise components cancelling one another out).

The resulting average signal is then played back for frequency analysis.

The different parts of apparatus used (coils, pulse generator, operational amplifier, commutator, register . . .) for carrying out the process of this invention are quite conventional and do not require any specific description since they are well known from any one skilled in the art. Furthermore most of them have already been used for prospection by means of magnetic nuclear resonance according to other methods (see for example "Nuclear Magnetism Logging" by R. J. S. Brown and B. W. Gamson in Journal of Petroleum Technology, August 1960).

What is claimed is:

1. A process for the detection of hydrocarbons in a subterranean formation placed in a constant magnetic field, which process comprises investigating the presence of protons bound to $C^{13}$ by, applying to said formation a magnetic prepolarization field oriented at an angle to the constant magnetic field; interrupting said prepolarization field to initiate the free precession of proton spins around said constant magnetic field; receiving the resultant free precession signal; isolating from said free precession signal at least a frequency line of said signal, whose value is substantially equal to one of the frequencies $\nu\pm(62\pm1)$ Hertz and $\nu\pm(79\pm1)$ Hertz, $\nu$ being a central frequency whose value expressed in Hertz is substantially equal to 4,257 times the number which expresses in oersteds the value of said constant magnetic field, and determining the intensity of said frequency line, said intensity being a function of the hydrocarbon content of said subterranean formation.

2. A process for the detection of hydrocarbons in subterranean formation, comprising investigating the presence of protons bound to $C^{13}$ by, the steps of applying to said formation a magnetic prepolarization field oriented at an angle to the earth's magnetic field; interrupting said prepolarization field to initiate the free precession of proton spins about the terrestrial magnetic field; receiving the resultant free precession signal spectrum; determining in said spectrum at least a frequency line of said signal, whose value is substantially equal to one of the frequencies $\nu \pm (62 \pm 1)$ Hertz and $\nu \pm (79 \pm 1)$ Hertz, $\nu$ being a central frequency whose value expressed in Hertz is substantially equal to 4,257 times the number which expresses in oersteds the value of said constant magnetic field, and determining the intensity of said frequency line, said intensity being a function of the hydrocarbon content of said subterranean formation.

3. A process as defined by claim 2 wherein are isolated two frequency lines corresponding to frequencies separated from the central frequency by an interval substantially equal to $62 \pm 1$ Hz.

4. A process as defined by claim 3 wherein the free precession signal is selected through a band-pass filter which is successively adjusted to a first frequency equal to an Hz. value of about 4,257 times the value expressed in oersteds of the terrestrial magnetic field, and then to a second frequency within an interval of substantially $62 \pm 1$ Hz. from the first frequency.

5. A process as defined by claim 1 wherein the free precession signal is filtered through a band-pass filter which is successively tuned to a first frequency equal to an Hz. value of about 4,257 times the value expressed in oersteds of the terrestrial field and then to a second frequency within an interval of $79 \pm 1$ Hz. from the first frequency.

6. A process as defined by claim 2 wherein the free precession signal is filtered through two adjustable band-pass filters one of which is set on a first frequency wherein the Hz. value is 4,257 times the value of the terrestrial field expressed in oersteds and the other one of which on a frequency within an interval of about $62 \pm 1$ Hz. from the first frequency.

7. A process as defined by claim 2 wherein the free precession signal is filtered through three band-pass filters of which the first is adjusted to a frequency $\nu$ equal in Hz. value to 4,257 times the value of the terrestrial field, expressed in oersteds, the second to a frequency substantially equal to $\nu - (62 \pm 1)$ Hz., and the third to a frequency substantially equal to $\nu + (62 \pm 1)$ Hz.

References Cited

UNITED STATES PATENTS 3,135,912  6/1964  Baker.

RUDOLPH V. ROLINEC, *Primary Examiner.*

MICHAEL J. LYNCH, *Assistant Examiner.*

UNITED STATES PATENT OFFICE
CERTIFICATE OF CORRECTION

Patent No. 3,439,260       Dated April 15, 1969

Inventor(s)   Georges J. Bene

It is certified that error appears in the above-identified patent and that said Letters Patent are hereby corrected as shown below:

Column 1, Line 62, change "precision" to ---precession---

Delete Line 66 and 67, Column 1

SIGNED AND
SEALED
OCT 20 1970

(SEAL)
Attest:

Edward M. Fletcher, Jr.
Attesting Officer

WILLIAM E. SCHUYLER, JR.
Commissioner of Patents